UNITED STATES PATENT OFFICE 2,458,351

HARD RUBBER

Leo J. Cukierski, Melrose Park, Ill., assignor to The Richardson Company, Lockland, Ohio, a corporation of Ohio No Drawing. Application April 27, 1944, Serial No. 533,059

3 Claims. (Cl. 260—727)

My invention relates to the production of hard rubber compositions and articles, and is directed primarily to the problems presented by the use of rubber dust in such compositions and articles.

It has long been understood that the manufacture of high grade hard rubber required the use of high grade hard rubber dust in the composition. The dust acted to prevent blowing and shrinking during molding. In some instances it improved the plastic flow and moldability of the compound; but it was found very important in eliminating shrink marks and pits, and in helping to maintain dimensions.

So vital has been the use of hard rubber dust in hard rubber compositions that it has been the practice to produce high grade hard rubbers merely for use as dust stocks. Suitable rubber compositions were prepared, coated on tin plates, and vulcanized under water in a steam vulcanizer. The resultant hard rubber panels were then ground to produce dust.

With the increasing scarcity of natural rubbers and the growing use of synthetics, it was first found that the dust from natural rubbers prepared as above was quite suitable for use with the synthetics. But when attempts were made to produce satisfactory dusts from the synthetics themselves serious difficulties were encountered. The synthetic hard rubber compositions had to be prepared with substantial quantities of softening agents or they could not be rolled upon and would not properly adhere to the tin plates. Cured synthetic hard rubbers so prepared were very difficult to grind and tended to produce unsatisfactory dusts. The dusts themselves, when used in synthetic hard rubber compositions, gave reasonably good tensile strengths but impaired elongation and impact values. The resultant hard rubbers were deficient in toughness.

No wholly satisfactory substitute for hard rubber dust has hitherto been found. Other filler materials are not suitable. For example, carbon black (which will not take the place of hard rubber dust in natural rubbers) does help to prevent blowing and shrinking in synthetic rubbers, but cuts down the dielectric properties of the articles produced.

An object of my invention is the provision of a material to take the place of the usual hard rubber dust, which material serves all of the purposes of the hard rubber dust but results in improvements both in the composition and in the molded article, producing better toughness and elongation, with less sticking, and with a better surface. It is an object of my invention to provide a material to take the place of the usual hard rubber dust which is substantially less expensive and which, in spite of the noted advantages, results in a saving in the cost of compositions and articles. It is my object to provide a material working equally well with synthetics and with natural rubbers, including reclaims. It is an object of my invention to provide a material to take the place of hard rubber dust but which will not alter either the specific gravity or the heat resistance of the molded articles.

These and other objects of my invention which will be set forth hereinafter or will be apparent to the skilled worker in the art upon reading these specifications, I accomplish in that material, in that procedure, and in those compositions and articles of which I shall now describe certain exemplary embodiments.

Briefly, in the practice of my invention, I have found that excellent results may be obtained, in proper procedures, through the use of minute particles of vulcanized soft rubbers in hard rubber compositions. The vulcanized soft rubber may comprise either natural or synthetic rubber hydrocarbons, including reclaims, providing the rubber hydrocarbon (or mixtures of hydrocarbons) are sufficiently unsaturated in the vulcanized form to become further vulcanized upon absorption of sulphur during the heat of molding. Preferably they are sufficiently unsaturated to be capable of forming hard rubbers.

The source of the vulcanized soft rubber may be any source desired; or soft, vulcanized rubbers may be specially prepared and then shredded, abraded or ground for my purpose. For example, there is on the market a relatively finely divided vulcanized rubber material known at "tire buffings," produced incident to the manufacture or recapping of rubber tires, and currently selling at around one and one-half cents per pound, compared with thirty-five cents per pound for high grade hard rubber dust. I may employ tire buffings in my process as hereinafter described. Also, I may prepare a suitable starting material by shredding, abrading or otherwise comminuting tire peel, tire carcasses, or whole used tires. The presence of some cellulosic content in the rubber is not objectionable; but if the rubber is derived from such sources as tire carcasses or whole tires, a treatment to reduce the fiber content to around, say, 3% by weight is desirable. Such a treatment may be a mechanical one as in the copending application of Rieser, Serial No. 425,242, filed December 31, 1941; but any other treatment which does not result in devulcanization may be employed.

Vulcanized, ground rubber scrap is itself tough and non-plastic. It cannot be handled or mixed on a mill as unvulcanized or devulcanized rubber can be handled and mixed. Hitherto it has not been regarded as anything more than a source of rubber for reclaiming. Even when vulcanized, ground rubber scrap is shredded to a fine particle size and is used as a filler in a hard rubber composition, it is impossible to obtain a smooth and well dispersed mix. No matter how long a milling it undergoes, the mix remains a lumpy, heterogeneous mass. The comminuted scrap remains intact and stubbornly refuses to become an integral part of the mix in spite of the severest physical coercion applied. Such a mix, when cured, results in a fair vulcanizate; but its tensile strength and elongation are very low. Throughout the entire cured piece, the scrap particles can easily be detected. Upon breaking such a cured composition, cleavage occurs between the soft rubber particle and the hard rubber matrix, indicating that the union between the particles is very weak and that no real coalescence has occurred. Thus, at best, ground, vulcanized rubber scrap acts as no more than a non-reinforcing, inexpensive filler, and it cannot take the place of hard rubber dust.

On the other hand, a vulcanized rubber material which has been devulcanized and thoroughly plasticized in any of the ways employed in current reclaiming practice will, when added to a hard rubber composition, merely increase the percentage of available rubber hydrocarbon without in any way acting as a filler, or performing any of the control functions of hard rubber dust.

I have found, however, that I can convert tough, vulcanized rubber scrap or its equivalent into a material which can act as a filler in hard rubber compositions with all of the advantages of hard rubber dust and the additional advantages which have already been mentioned. In converting such a substance into a material, I reduce the vulcanized rubber to an exceedingly fine and uniform particle size; but I do this without causing it to lose its essential particle form or causing it to become completely plasticized or devulcanized. Nevertheless, I so treat it that the minute particles of the tough, vulcanized rubber acquire a partially plasticized surface.

A small particle size is important because the smaller the particles, the more readily are they wetted by the surrounding matrix when compounding them into a hard rubber composition. Consequently, a better blend and a more uniform mix can be expected.

The softer and more plastic the surfaces of the particles become, the better the bond with the surrounding matrix. The softening of a vulcanized rubber can be accomplished in various ways. If oils or softeners are employed, they must be used in large quantities in order to penetrate the surfaces; but too much oil tends to cut down the tensile strength. Devulcanization under heat produces a plasticized material effectively; but it also causes a degradation of the rubber. Depolymerization of the rubber makes it extremely difficult to use in practical processing. In the employment of softeners or heat, or both, for plasticizing, difficulty is experienced in avoiding carrying the plasticizing too far.

I have discovered that I can break down the ground, vulcanized rubber scrap or its equivalent to a very fine particle size by mechanical grinding on a tight mill, and that I can concurrently partially plasticize it by a controlled build up of the frictional heat involved, and without the use of a softener. By a high frictional mill grinding, I comminute the vulcanized rubber particles to a very fine particle size until they undergo a partial plasticization at the surfaces but not throughout the particles. This stage is detectable by the appearance of a cohesive action just short of the sufficient cohesion to form a continuous sheet. I have thus found that a safe guide is provided by observation of the material. The comminuted vulcanized rubber is placed on a tight mill, and the milling is stopped at the point where the rubber begins to show a tendency to sheet on the rolls. At this stage, it is still in essential particle form, as can be seen under microscopic examination, but the particles are uniform and very fine. Because the particles are partially plasticized at the surfaces only, they can now readily mix with a hard rubber composition, becoming an essential part of a continuous whole, and forming a strong bond with the matrix.

A soft, vulcanized rubber in particle form, prepared as indicated, when added in whole or in part in replacement of the usual hard rubber dust not only acts equally well to prevent blowing and shrinking, to eliminate shrink marks and pits, and to maintain dimensional characteristics, but also to produce molded articles superior in toughness, elongation and surface, while substantially reducing sticking.

Without wishing to be bound by theory, I believe that these results flow from a tendency of the minute, soft, vulcanized rubber particles to absorb sulphur from the composition in which they are suspended and to become further vulcanized during the molding to a harder condition or to hard rubber at their surfaces. This produces a bond between the surrounding composition and the particles themselves not attainable through the use of hard rubber dust or other filler, and it markedly tends to increase the toughness and tensile strength of the molded articles. The vulcanization of the particles is, however, a superficial or skin effect, as I believe, and does not proceed throughout the volume of each particle. Hence, elongation is increased. The particles in surface-hardened condition perform all of the other functions of hard rubber dust.

The effect becomes evident in the testing of cured test bars. The results of the straight and treated ground rubber scrap are as follows:

| Cure | Straight | | Treated | |
| --- | --- | --- | --- | --- |
|  | Tensile | Elongation | Tensile | Elongation |
|  |  | Per cent |  | Per cent |
| 20/90 | 865 | 5.1 | 2,070 | 73.3 |
| 40/90 | 1,155 | 1.8 | 2,740 | 53.1 |
| 60/90 | 1,680 | 1.0 | 3,060 | 35.0 |

My soft, vulcanized rubber in particle form is added to and compounded with the other ingredients of a hard rubber composition in the usual way and in the usual amounts for hard rubber dust unless some special effect is desired. Where wholly substituted for the hard rubber dust, it is usually possible to use somewhat more of my material than of the dust without encountering difficulty, thus effecting some further saving in cost. Moreover, when employing my material in place of hard rubber dust in otherwise known compositions, because of the improvements of the physical characteristics of the molded articles resulting from my material, it is frequently possible to add small amounts of mineral fillers and still meet the specified tests, thus effecting yet another reduction in cost.

As indicated, the rubber hydrocarbon in the hard rubber composition may be of natural, synthetic or reclaimed character. By synthetic rubbers, I have in mind butadiene styrene copolymer (G. R. S.) and butadiene acronitrile copolymer (oil resistant). These are the synthetic rubbers available at this time in the United States which are sufficient unsaturated to form hard rubbers upon suitable vulcanization. The remainder of the so-called synthetics currently available are not considered suitable for hard rubber compositions. However, I do not desire to limit my invention to the two named synthetics since there are other sufficiently unsaturated ones which may in the future be produced commercially.

In compounding the compositions, the usual procedure is followed. The use of my material in place of the hard rubber dust may in instances require the use of a slightly larger amount of softener during compounding, especially of synthetic rubbers or reclaimed rubbers. Many softeners are available, and the nature of the softener is not a limitation upon my invention. The most available softeners include any of the unsaturated petroleum oils, the various coal tar products which have been found suitable for this purpose, and a number of others, like residue materials derived from turpentine distillation. The skilled rubber compounder will know the amount of softener to add from the manner in which the composition works on the compounding mill.

Prior to my invention, a typical formula for a hard rubber storage battery box was:

| | Pounds |
|---|---|
| Smoked sheet | 100 |
| Sulphur | 40 |
| High grade hard rubber dust | 120 |
| Accelerators | 2.5 |
| Softener | 5 |

This produced a high grade box having a tensile strength between 3000 and 5000 lbs. per square inch with about a 6% elongation.

A satisfactory formula in the practice of my invention is as follows:

| | Pounds |
|---|---|
| G. R. S. | 100 |
| My particle form soft vulcanized rubber | 120 |
| Accelerators | 3 |
| Softener | 10 |
| Sulphur | 45 |

This produces a superior storage battery box having a tensile strength of from 4000 to 6000 lbs. per square inch and an elongation between 5 and 20%.

A typical formula under my invention for a hard rubber using reclaimed rubber is:

| | Pounds |
|---|---|
| Tioga (a reclaim) | 150 |
| My particle form soft vulcanized rubber | 100 |
| Magnesium oxide | 2.5 |
| A-32 (an accelerator) | 1.0 |
| Sulphur | 44 |
| Softener | 10 |

A typical formula employing both reclaim and synthetic rubber is as follows:

| | Pounds |
|---|---|
| G. R. S. | 10 |
| Tioga | 150 |
| My particle form soft vulcanized rubber | 100 |
| Furnex (carbon black) | 20 |
| Clay | 25 |
| Hard rubber (reclaim) dust | 30 |
| Petrolatum | 10 |
| B. R. T. (a coal tar softener) | 10 |
| Magnesium oxide | 2.5 |
| A-32 | 1.0 |
| Sulphur | 44 |

A typical formula for a high impact hard rubber stock may be as follows:

| | Pounds |
|---|---|
| Tioga | 150 |
| My particle form soft vulcanized rubber | 100 |
| Furnex | 20 |
| Clay | 20 |
| Baur fiber | 220 |
| Naftoleen | 90 |
| Petrolatum | 10 |
| Magnesium oxide | 5.0 |
| 808 (an accelerator) | 2 |
| Sulphur | 75 |

These formulae are exemplary merely of certain classes of hard rubber compositions in which my material may be employed, and the battery boxes or other articles produced by my process. Modifications may be made in my invention without departing from the spirit of it. Having thus described my invention in certain exemplary embodiments, what I claim as new and desire to secure by Letters Patent is:

1. A hard rubber dust filler substitute for use with sulphur-vulcanizable compositions of the group of natural rubber and synthetic rubber in making hard material, which consists of a mill ground soft rubber of vulcanized condition in minute particle form, the particles plastic on the surface only and the mass just short of a condition of sheeting on the mill.

2. The process of preparing a hard rubber dust filler substitute for use with sulphur vulcanizable composition of the group of nautral rubber and synthetic rubber in making hard material, which consists in milling between rolls, scrap of soft vulcanized rubber to the extent of bringing it to a minute particle form with the particles plastic on the surface only and showing a tendency to sheet on the rolls of the mill.

3. As a substitute for rubber dust in molding compositions, a rubber crumb which consists of particles of vulcanized soft rubber, the surfaces of which are plastic but in which the plasticity is short of sufficient to cause the particles to go together on the rubber mill in a continuous sheet.

LEO J. CUKIERSKI.

REFERENCES CITED

The following references are of record in the file of this patent:

UNITED STATES PATENTS

| Number | Name | Date |
|---|---|---|
| 2,089,810 | Penning | Aug. 10, 1937 |
| 2,096,336 | Pickett | Oct. 19, 1937 |

FOREIGN PATENTS

| Number | Country | Date |
|---|---|---|
| 121,136 | Great Britain | Mar. 29, 1920 |